(12) United States Patent
Geisler

(10) Patent No.: US 10,859,063 B2
(45) Date of Patent: Dec. 8, 2020

(54) POWER REDUCTION IN A PLURALITY OF WIND POWER PLANTS IN A WIND FARM

(71) Applicant: SENVION GmbH, Hamburg (DE)

(72) Inventor: Jens Geisler, Rendsburg (DE)

(73) Assignee: SENVION GmbH, Hamburg (DE)

( * ) Notice: Subject to any disclaimer, the term of this patent is extended or adjusted under 35 U.S.C. 154(b) by 51 days.

(21) Appl. No.: 16/028,801

(22) Filed: Jul. 6, 2018

(65) Prior Publication Data

US 2019/0010921 A1    Jan. 10, 2019

(30) Foreign Application Priority Data

Jul. 7, 2017  (DE) .......................... 10 2017 006 452

(51) Int. Cl.
*F03D 7/02* (2006.01)
*F03D 7/04* (2006.01)
*G05B 13/02* (2006.01)

(52) U.S. Cl.
CPC ........... *F03D 7/028* (2013.01); *F03D 7/0284* (2013.01); *F03D 7/043* (2013.01); *F03D 7/047* (2013.01); *F03D 7/048* (2013.01); *G05B 13/024* (2013.01); *F05B 2270/1033* (2013.01); *F05B 2270/20* (2013.01); *F05B 2270/335* (2013.01); *F05D 2270/20* (2013.01); *F05D 2270/335* (2013.01)

(58) Field of Classification Search
CPC ........ F03D 7/042; F03D 7/028; F03D 7/0284; F03D 7/043; F03D 7/047; F03D 7/048; F03D 9/255; F03D 9/257; G05B 13/024; F05B 2270/103; F05B 2270/335; F05D 2270/20; F05D 2270/335

USPC ......................................................... 700/287
See application file for complete search history.

(56) References Cited

U.S. PATENT DOCUMENTS

| | | | |
|---|---|---|---|
| 2005/0119813 A1* | 6/2005 | Loeffler | ................. B60K 6/485 701/48 |
| 2008/0150283 A1 | 6/2008 | Rivas et al. | |
| 2009/0033097 A1 | 2/2009 | Jurkat et al. | |
| 2010/0274401 A1* | 10/2010 | Kjaer | .................... F03D 7/0284 700/287 |

(Continued)

FOREIGN PATENT DOCUMENTS

| | | |
|---|---|---|
| DE | 10 2013 203 540 A1 | 9/2014 |
| EP | 2 254 217 A2 | 11/2010 |

(Continued)

OTHER PUBLICATIONS

Search Report dated Apr. 24, 2018, directed to German Application No. 10 2017 006 452.0, 10 pages.

(Continued)

*Primary Examiner* — Michael J Brown
(74) *Attorney, Agent, or Firm* — Morrison & Foerster LLP

(57) ABSTRACT

A method for operating a wind farm in a reduced-power throttle mode in which a farm master determines an individual setpoint power reduction for each participating wind power plant by determining an available power for each wind power plant, reducing this available power by a reduction proportion; determining the reduction proportions using an optimization method with the optimization condition of equal increase time for the wind power plants; and repeating until the optimization method reaches a presettable termination criterion.

17 Claims, 3 Drawing Sheets

(56) References Cited

U.S. PATENT DOCUMENTS

| | | |
|---|---|---|
| 2010/0308585 A1 | 12/2010 | Jorgensen et al. |
| 2011/0175353 A1 | 7/2011 | Egedal et al. |
| 2014/0103652 A1 | 4/2014 | Ubben et al. |
| 2015/0275862 A1* | 10/2015 | Babazadeh ............... H02J 3/50 290/44 |

FOREIGN PATENT DOCUMENTS

| | | |
|---|---|---|
| EP | 2 028 368 B1 | 4/2013 |
| WO | 2015/130289 A1 | 9/2015 |

OTHER PUBLICATIONS

Search Report dated Nov. 26, 2018, directed to European Application No. 18181895.6; 7 pages.

* cited by examiner

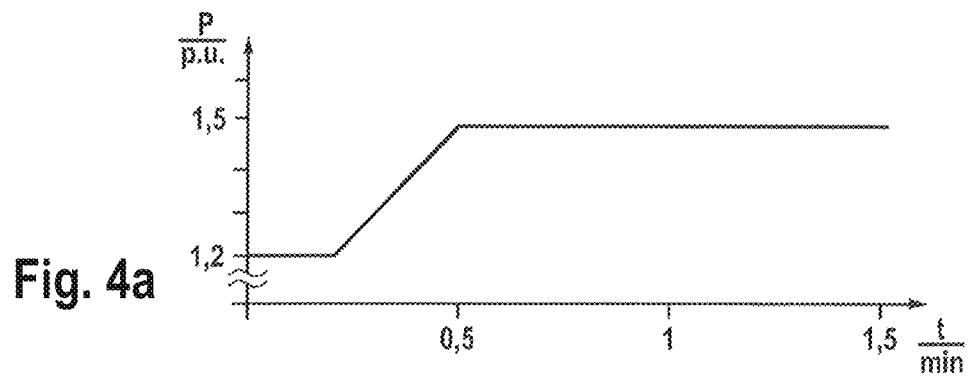
Fig. 4a
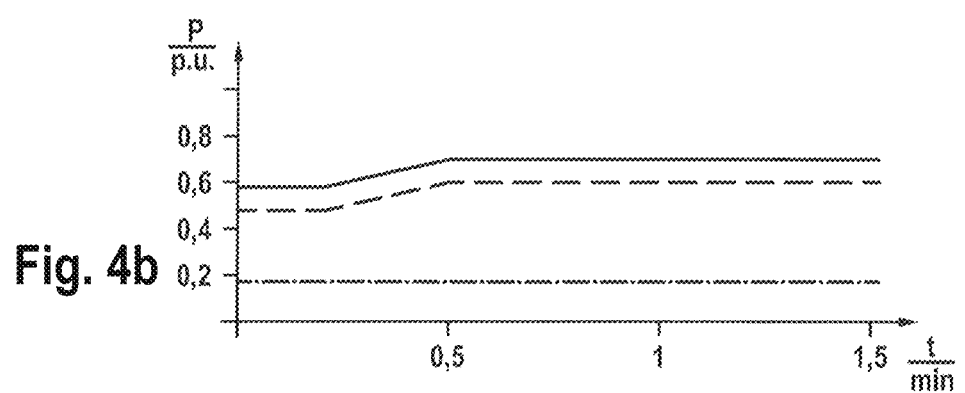
Fig. 4b
Fig. 5
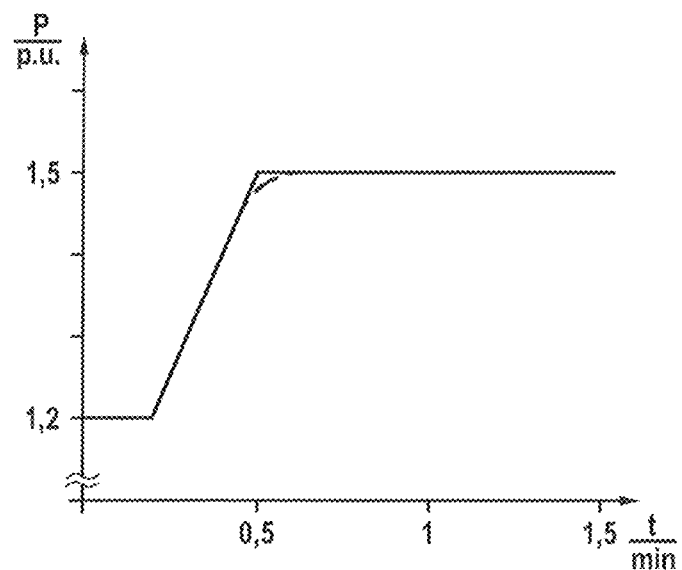

POWER REDUCTION IN A PLURALITY OF WIND POWER PLANTS IN A WIND FARM

CROSS-REFERENCE TO RELATED APPLICATIONS

This application claims the priority of German Application No. 10 2017 006 452.0, filed Jul. 7, 2017, the entire contents of which are incorporated herein by reference.

FIELD OF THE INVENTION

The invention relates to a method for power reduction in a wind farm, which generally comprises a farm master and a plurality of wind power plants which generate and output electrical power.

BACKGROUND OF THE INVENTION

With the increase in renewable sources, wind farms are also increasingly being used to make a contribution to mains stability. Wind farms make their contribution, for example, by controlling the output of power, including in respect of the output of active power. Here, the demands made of the wind farms in respect of control quality are ever higher. In particular, a relatively high control rate is required in the event of changes in power demand.

When a wind farm as a whole is required to output less power, the power output of the individual wind power plants has to be reduced. To date, it was known, for this purpose, to determine new prespecified setpoint values for the individual wind power plants and to transmit said prespecified setpoint values to said wind power plants. Owing to the individual prespecification, this method is relatively slow in the case of dynamically changing prespecifications with frequently updated prespecifications and is therefore not suitable for high control rates. Furthermore, it is known to determine a common joint prespecified value and transmit this to the wind power plants. This has the advantage of rapid transmission, but can, in particular, lead to problems in wind power plants with difficult wind conditions (for example a little wind). Said wind power plants cannot fully comply with frequently changing prespecifications for power output (owing to the lack of enough wind). This has a considerable adverse effect on the total control behavior of the wind farm.

EP 2 028 368 B1 discloses a further method. Here, the available power, which is dependent on the respective wind conditions, is determined for each wind power plant. The power output of each wind power plant is then reduced on a percentage basis depending on the external prespecification for the wind farm as a whole. Therefore, all of the wind power plants can comply without problems in the case of a power reduction, however not all of the wind power plants may be able to comply in the case of a power increase. This means that the dynamics of the control behavior is not optimal in the case of a power increase.

SUMMARY OF THE INVENTION

According to some embodiments, a method for operating a wind farm which comprises a farm master and a plurality of wind power plants, each with a controller, for generating electrical power, where the farm master prespecifies the power output of the wind power plants, and the wind farm can be operated in a normal mode and a reduced-power throttle mode, where, in the throttle mode, a signal for a power reduction of the wind farm $\Delta P_{set,farm}$ is applied to the farm master and participating wind power plants throttle their power generation on this basis, which provides for defining an individual setpoint power reduction Pset(i) for each participating wind power plant, includes: determining an available power $P_{avail(i)}$ for each of the participating wind power plants and reducing this available power by a reduction proportion $\Delta P_i$; determining the reduction proportions $\Delta P_i$ using an optimization method with the optimization condition of $T_{regain,\ opt}$=Tregain($\Delta P_i$, $x_i$) for all participating wind power plants; and repeating until the optimization method reaches a presettable termination criterion.

A few of the terms used are first of all explained below.

"Available power" is understood to mean that power which a wind power plant can output at a maximum under the currently prevailing (wind) conditions.

An "increase time" is understood to mean that time period which is required by the wind power plant to increase its power output from a first relatively low value to a second relatively high value, in particular an unthrottled power value.

Without being bound by any theory, aspects of the invention are based on the knowledge that the dynamic control quality of the entire wind farm can be considerably increased as part of an optimization method by taking into account the ability of the individual wind power plants to increase power. By virtue of the invention, it is possible to achieve a dynamically high-quality control behavior of the wind farm not only in the case of power reduction, but now also in the case of power increase. By virtue of taking into account the individual ability of the individual wind power plants to increase power, the invention makes it possible for the wind power plants to synchronously reach their respectively maximum power output. Negative side effects, such as overshoots or slow asymptotic approximations which sometimes occur in the prior art, are therefore effectively avoided.

Furthermore, according to some embodiments, the invention has identified that executing the optimization method incompletely may possibly be advantageous. This provides the advantage of faster processing. Therefore, an improved real-time capability can be achieved. This applies particularly when the incomplete execution takes place over a fixed period. This ensures that new optimization results are ready in good time for the next processing step.

The fixed period is advantageously a time period. This has the advantage that a real-time capability can be achieved in this way-within defined limits. However, it can also be provided that the period is determined by a number of repetitions of the optimization method.

The optimization method can be expediently executed incrementally, specifically starting from the results of the optimization run which was executed last (also called warm starting). Therefore, it is not necessary for the full calculation to be executed for each run. Rather, it suffices to only partially run through that optimization method (for example over a fixedly prespecified number of iteration steps). In this case, the intermediate result of the preceding run is then used in a following run of the optimization method. Therefore, the computational intensity in an individual run is considerably reduced and, nevertheless, convergence is ultimately achieved over a plurality of runs.

Particularly in the case of incomplete optimization, it has proven useful to enforce compliance with a secondary condition. For example, a secondary condition can be that the sum of the power reduction at the wind power plants should correspond to the required power reduction of the wind farm overall ($\Sigma \Delta P_i = \Delta P_{set,farm}$), and this is taken into account as a secondary condition in the optimization method, and enforced if necessary. However, depending on the optimization algorithm, secondary conditions are also satisfied only when convergence is achieved. In that case, a suitable measure has to be taken after premature termination in order to nevertheless enforce the secondary condition. This can be performed, for example, by means of scaling by a correction factor.

The method, according to some embodiments, can advantageously be further improved by including a minimum power, which is to be met, of the wind power plants as a further secondary condition. This ensures that each wind power plant provides a certain active power, and it is on the other hand also subject to loading with active power. Therefore, complete relief of loading of the wind rotor is avoided, as a result of which the risk of instabilities in the drive train of the wind power plant owing to excessive relief of loading is effectively countered.

Furthermore, provision can be made to exclude some of the wind power plants of the wind farm, in particular those with available power below a settable threshold. This prevents wind power plants with an excessively low available power from inhibiting the optimization method.

It is advantageously provided that a function for mapping the increase time of the participating wind power plants is stored, preferably as a polynomial. As a result, the delay time of the respective wind power plants can be directly numerically calculated in an analytical manner. However, provision can also be made to store the function for the increase time in a characteristic map, preferably a multidimensional characteristic map. This has the advantage of high speed.

Furthermore, it can be prespecified to execute the optimization method in an at least partially decentralized manner. Therefore, data relating to the wind power plants which is kept on site can be used more efficiently.

The use of a nonlinear optimization method, such as the Newton method for example, is particularly expedient. The optimization method can be better matched to the properties of the wind power plants in this way. Therefore, the control quality and also the optimization rate can be improved.

The invention further relates to a correspondingly operated wind farm. Reference is made to the below description for more detailed explanation.

BRIEF DESCRIPTION OF THE DRAWINGS

The invention will be explained in more detail below using an exemplary embodiment with reference to the appended drawing, in which:

FIGS. 4a-b show graphs illustrating the power behavior of the wind farm and of the wind power plants; and FIG. 5 shows a comparison with the prior art.

DETAILED DESCRIPTION OF THE INVENTION

Figure 1:
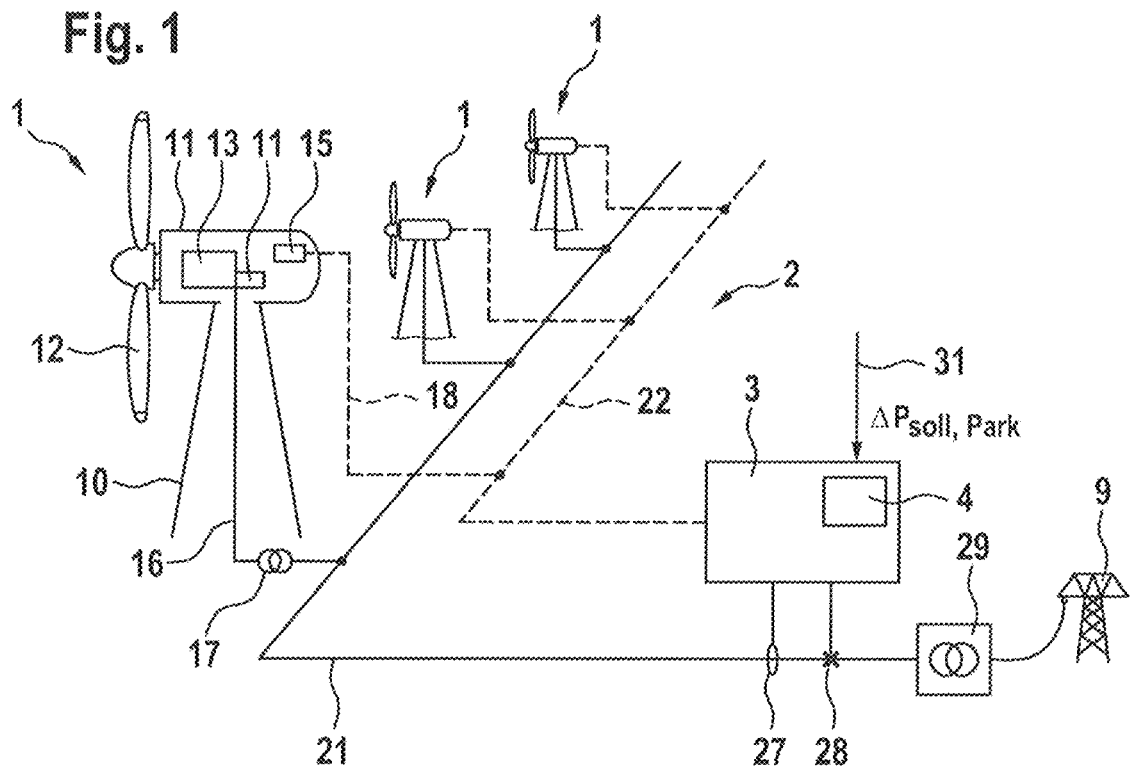
FIG. 1 shows an overview of a wind farm according to one exemplary embodiment of the invention.

FIG. 1 shows a wind farm according to one exemplary embodiment of the invention. Said wind farm comprises a plurality of wind power plants 1, which are connected to one another by means of a farm-internal supply system 2, and also a farm master 3.

In the illustrated exemplary embodiment, the wind power plants 1 are of substantially identical construction. They each have a tower 10, a nacelle 11 being arranged at the top end of said tower such that it can be pitched about in the azimuthal direction. A wind rotor 12 is rotatably arranged on one end side of the nacelle 11 and drives a generator 13 by means of a rotor shaft (not illustrated). The generator 13 interacts with a converter 14 in order to generate electrical energy which is output to a busbar system 21 of the farm-internal supply system 2 via a connection line 16 with a plant transformer 17 which is arranged thereon. The operation of the wind power plant 1 is controlled by a respective operation controller 15 which is likewise arranged in the nacelle 11. The operation controller 15 is connected to a signal supply system 22 of the farm-internal supply system 2 via a signal line 18.

The farm master 3 is further connected to the signal supply system 22. It serves for superordinate control of the wind power plants 1 and, to this end, is connected to the operation controller 15 of the wind power plants 1 via the signal supply system 22. The farm master 3 has a control connection 31 to which prespecifications can be applied (for example a power reduction $P_{set,farm}$ or $\Delta P_{set,farm}$ which is demanded of the wind farm as a whole). Said prespecifications can originate from a superordinate entity (such as the supply system operator) or be generated locally in the wind farm (for example by means of a frequency droop).

All of the electrical power which is generated by the wind power plants 1 is collected via the busbar system 21 and output to a power supply system 9 via a main transformer 29. The voltage and current intensity of the power which is output to the power supply system 9 are detected by means of corresponding voltage and current sensors 27, 28 in the region of the transformer 29 and applied to the farm master 3 as measurement variables.

The farm master 3 comprises, amongst other things, a power controller 4. Said power controller is designed to control the power which is output by the wind farm, via the main transformer 29, to the power supply system 9.

Figure 2:
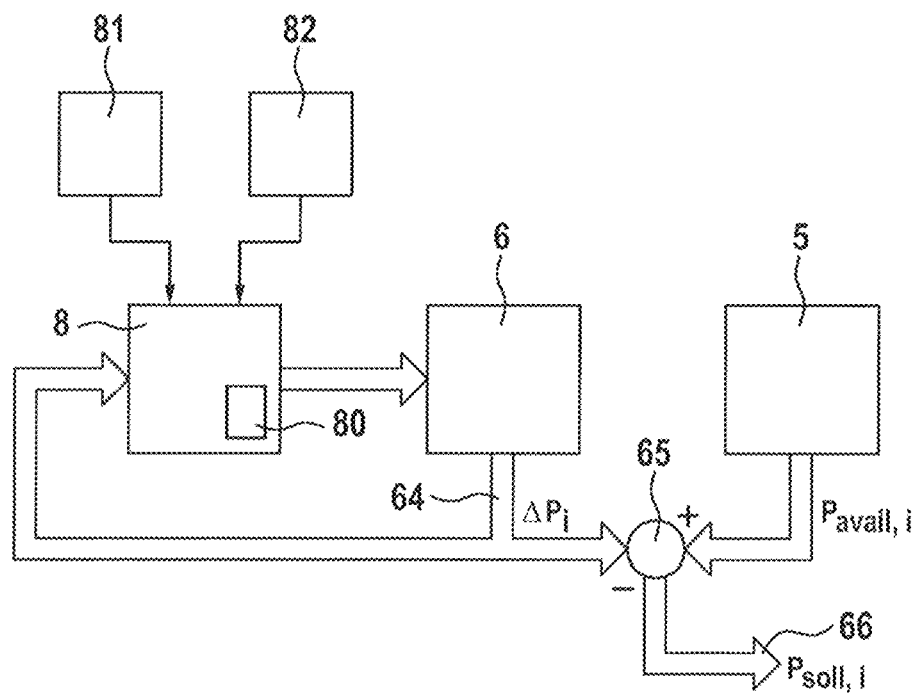
FIG. 2 shows a schematic illustration of a power controller in the farm master.
Figure 3:
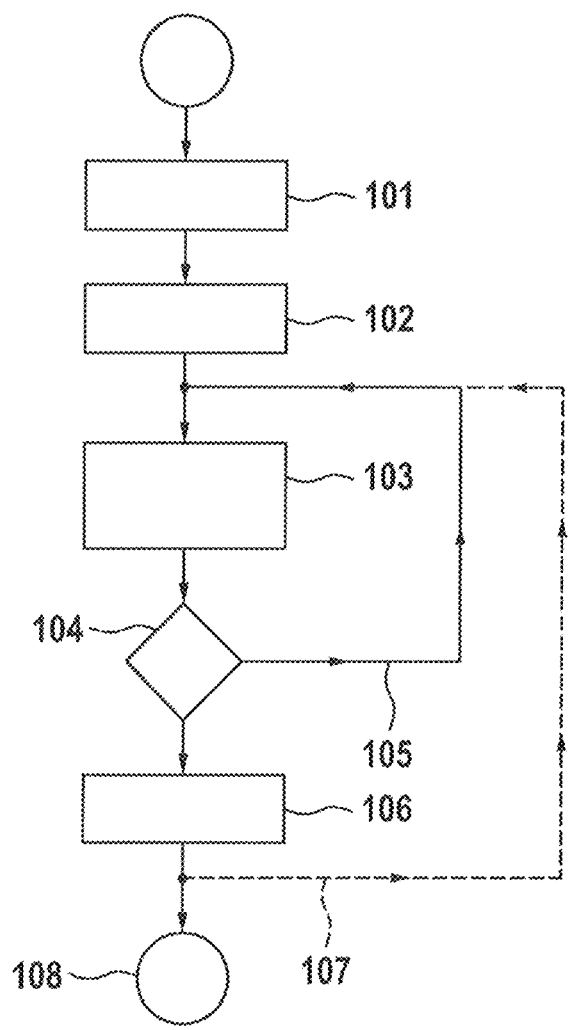
FIG. 3 shows a flowchart.

In a normal mode, the wind power plants 1 generate as much electrical power as is possible under the current wind conditions and feed said power into the power supply system 9 via the main transformer 29. However, a reduced-power mode can also be selected by a power reduction being prespecified to the farm master 3 by the superordinate entity. The farm master 3 therefore receives a value for a power reduction $\Delta P_{set,farm}$ to be performed by the wind farm overall. According to the invention, the power controller 4 is designed to determine new setpoint values for the wind power plants 1 in this case, specifically in such a way that they are matched in an optimum manner to the power increase dynamics in the farm. Reference is made to FIGS. 2 and 3 for further explanation. A setpoint value distribution unit 5 is provided for this purpose. The input variable to said setpoint value distribution unit is the power reduction $\Delta P_{set,farm}$ to be performed and said setpoint value distribution unit outputs, as output signal, a signal vector, calculated from said input variable, for individual setpoint power values $P_{set,i}$ of the participating wind power plants.

The method according to the invention provides that each wind power plant receives a setpoint power value $P_{set,i}$ which is made up of the current available power $P_{avail,i}$ of said wind power plant minus an individual reduction proportion $\Delta P_i$, where the index represents the sequence number of a wind power plant 1 in the wind farm:

$$P_{set,i} = P_{avail,i} - \Delta P_i$$

A determination unit 7 is provided for determining the currently available power. Said determination unit is designed to calculate the available power $P_{avail,i}$ for each wind power plant 1 on the basis of parameters which are generally present in the farm master 3 in any case (for example local wind speed at the respective wind power plant 1). As an alternative, the determination unit can also be located in a manner distributed over the respective wind power plant and the result of the calculation can be transmitted to the farm master via the signal supply system. The sum of these values for the wind power plants 1 of the wind farm is output as a vector $P_{avail,i}$ and applied to a positive input of a subtraction element 65.

The reduction proportions $\Delta P_i$ are determined individually for the respective wind power plant 1 by means of a calculation unit 6. Here, the calculation unit 6 interacts with an optimization unit 8, having an optimization condition unit 80 implemented therein, in such a way that optimization is preferably performed taking into account two secondary conditions.

As optimization condition 80, it is implemented in the optimization unit 8 that the time period required by each of the wind power plants 1 for increasing the power output from the reduced mode to the maximum possible available power is the same. If the time required by a wind power installation i in order to increase its power output from the reduced mode back to the maximum possible available power is called $T_{regain,i}(\Delta P_i, x_i)$, then the following is true for the optimization condition unit 80:

$$T_{regain,i}(\Delta P_i, x_i) = T_{regain,opt} \forall i$$

Here, the time $T_{regain,i}(\Delta P, x_i)$ is a measure of the power increase dynamics of the plant. It depends on the extent of the planned reduction and possibly on further internal states of the wind power plant. These states $x_i$ can comprise, in particular, the wind speed acting locally at the wind power plant 1 or the available power of the wind power plant 1.

The function $T_{regain,i}(\Delta P, x_i)$ is expediently stored as a characteristic map or polynomial in the optimization condition unit 80. Owing to the frequently nonlinear property of $T_{regain,i}(\Delta P, x_i)$, an iterative optimization, which is executed by the optimization unit 8, is generally required in order to calculate $\Delta P_i$ in accordance with the abovementioned formulas.

This is done taking into account the two secondary conditions which are implemented in a first and a second secondary condition unit 81, 82. Here, it is implemented in the first secondary condition unit 81 that the sum of all $\Delta P_i$ reduction proportions of the wind power plants 1 corresponds to the desired reduction of the farm in total:

$$\Sigma \Delta P_i = \Delta P_{set,park}.$$

In the second secondary condition unit 82, it is implemented as a secondary condition that each of the wind power plants 1 is operated above a prespecifiable absolute minimum active power in spite of the reduction by $\Delta P_i$.

The values for the reduction proportions $\Delta P_i$ of the individual wind power plants 1, which values are calculated by the optimization unit 8 in combination with the calculation unit 6, are output by the calculation unit 6 as an output vector 64 and applied to a negative input of the subtraction element 65. The subtraction element 65 then calculates setpoint power values $P_{set,i}$ from said output vector as specified above and outputs said setpoint power values as a signal vector 66. These are applied by the farm master 3 to the respective wind power plants 1 via the signal supply system 22.

The execution and the result will be explained with reference to FIGS. 3 and 4.

At the beginning, the wind power plants 1 (three wind power plants are illustrated by way of example) are operated in a throttled manner. In the process, two of the wind power plants with a nominal power of, for example, 5 MW output the full power, which is available owing to the wind, of 3.5 MW or 3 MW, while a third smaller wind power plant with a nominal power of 3 MW outputs only 1 MW owing to a locally unfavorable wind (see FIGS. 4a and b, period of time up to $t_0$). Therefore, the farm outputs a total of 7.5 MW (step 101).

At time $t_0$, throttling comes into effect, specifically to 6 MW (step 102). Therefore, starting from 7.5 MW, the power reduction $\Delta P_{set,farm} = 1.5$ MW. It is now necessary, below, to individually determine new setpoint power values $\Delta P_i$ for each of the wind power plants 1. This is done in step 103. Here, reduction proportions are individually calculated for the wind power plants 1 by the optimization unit 8 as described above taking into account the secondary conditions, as are implemented in the units 81, 82, assuming an identical increase time. Therefore, throttled power values of 2.8 and, respectively, 2.4 and, respectively, 0.75 MW are produced for the three wind power plants, as illustrated in FIG. 4b) in the time range (from $t_0$ to $t_1$). Therefore, the total power of the wind farm in the throttled mode is 6 MW, as is illustrated at time $t_1$ in FIG. 4a. The difference in the throttled power values is caused by the optimization condition which aims for synchronization of the time which is required for the power increase after canceling the throttling. Here, the reduction is set such that, after the throttling is canceled, all of the wind power plants 1 then reach their maximum value again at the same time.

At time t=1.2 min, this throttling is canceled (step 102) and the wind power plants 1 each increase their power, specifically in such a way that the total power of the wind farm increases to the original power of 7.5 MW again.

Here, the active power output of each of the wind power plants 1 increases continuously (see time range from 1.2 to 1.5 min in FIG. 4b), and the total power output of the wind farm overall correspondingly rises (see FIG. 4a). It can be seen that the power increase in the case of the wind power plants has different gradients, but lasts for the same amount of time in all of the participating wind power plants 1. This is caused by the abovementioned optimization condition. Therefore, the desired effect that all of the participating wind power plants 1 ultimately reach their unthrottled maximum value again at the same time (here: t=1.5 min) is achieved. Therefore, the farm also reaches its maximum value again with a constantly rising power within the shortest time. This can be clearly seen in FIG. 4a, where the total power output of the wind farm quickly assumes the original value for the power output again without overshoots or without asymptotic creepage behavior. This is done rapidly and accurately.

Here, the optimization does not have to be executed completely in step 103. It can also suffice to execute the optimization over a settable period. This is implemented in the query 104. Here, a number of optimization steps or a prespecifiable convergence criterion (also referred to herein as a presettable termination criterion) is checked. If the convergence criterion is not yet met, the process branches back to the optimization method (step 105). If the convergence criterion is met (a specific number of optimization steps is achieved or the convergence is better than a prespecifiable limit amount), the new values for the power output are transmitted from the farm master 3 to the wind power plants 1 in step 106, and the wind power plants 1 are correspondingly operated. The optimization method is then optionally continued in a next step 107 (in a new computation cycle), based on the results achieved in the preceding step. Therefore, quick calculation can be linked with (long-term) guaranteed convergence. As an alternative, the optimization method can also be terminated (step 108).

A comparison with a solution according to the prior art is illustrated in FIG. 5. In said figure, the total power output of the wind farm is illustrated with respect to time in a manner similar to that in FIG. 4a. The curve according to the invention is illustrated by a solid line, that according to the prior art (where it differs) is illustrated by a dotted line. It can be seen that, after the end of the throttling, there is a delay, similar to an asymptotic (creepage) approximation, in the prior art when the value for the unthrottled operation is reached again. This is prevented according to the invention, so that the increase is quicker and more uniform and does not exhibit any creepage behavior or overshoots. The wind farm which is operated according to the invention therefore reaches the unthrottled value more rapidly and more uniformly. This is a considerable advantage in respect of the ability to control the wind farm

The invention claimed is:

1. A method for operating a wind farm that comprises a plurality of wind power plants, each with a controller, for generating electrical power and a farm master for controlling the power output of the wind power plants, wherein the wind farm can be operated in a normal mode and a reduced-power throttle mode, the method comprising, in the throttle mode:
   receiving at the farm master a signal for a power reduction of the wind farm $\Delta P_{set,farm}$;
   determining an individual setpoint power reduction $P_{set,i}$ for each participating wind power plant of the plurality of wind power plants, wherein determining the individual setpoint power reduction comprises:
      determining an available power $P_{avail(i)}$ for each of the participating wind power plants,
      determining a power reduction proportion $\Delta P_i$ for each participating wind power plant using an optimization method that is based on an optimization condition of equal power increase time $T_{regain, opt} = T_{regain, i}$ for all of the participating wind power plants, wherein the determination of the power reduction proportion is repeated until the optimization method meets a presettable termination criterion, and
      subtracting the power reduction proportion $\Delta P_i$ for a respective participating wind power plant from the available power $P_{avail(i)}$ for the respective participating wind power plant; and
   providing the individual setpoint power reduction $P_{set,i}$ to each participating wind power plant for throttling each participating wind power plant.

2. The method of claim 1, wherein the optimization method is carried out incompletely over a fixed period.

3. The method of claim 2, wherein the period is a time period.

4. The method of claim 2, wherein the period is a number of repetitions.

5. The method of claim 2, wherein the optimization method is executed incrementally, starting from the result of an optimization method that was executed last.

6. The method of claim 1, wherein the optimization method comprises enforcing a secondary condition even in the case of incomplete optimization.

7. The method of claim 6, wherein the enforcement is executed by a correction factor.

8. The method of claim 6, wherein the secondary condition comprises a sum of the reduction proportions $\Delta P_i$.

9. The method of claim 8, wherein the secondary condition comprises the sum of the reduction proportions being equal to the power reduction of the wind farm.

10. The method of claim 1, wherein the determination of the individual setpoint power reduction $P_{set,i}$ for each participating wind power plant is based on a minimum power of each participating wind power plant.

11. The method of claim 1, wherein at least one wind power plant of the plurality of wind power plants are excluded from throttling.

12. The method of claim 11, wherein the at least one wind power plant that is excluded has available power that is below a settable threshold.

13. The method of claim 1, wherein the optimization method uses a polynomial function for the increase time of the participating wind power plants that is stored at the farm master.

14. The method of claim 1, wherein the optimization method uses a multidimensional characteristic map function for the increase time of the participating wind power plants that is stored at the farm master.

15. The method of claim 1, comprising locally calculating an increase time at each participating wind power plant and transmitting the increase time from each participating wind power plant to a central unit for the optimization method.

16. The method of claim 1, wherein execution of the optimization method is at least partially decentralized.

17. A wind farm operable in a normal mode and a reduced-power throttle mode, the wind farm comprising:
   a plurality of wind power plants, each with a controller, for generating electrical power; and
   a farm master for controlling the power output of the wind power plants, wherein the farm master is configured to, in the throttle mode:
      receive at the farm master a signal for a power reduction of the wind farm $\Delta P_{set,farm}$;
      determine an individual setpoint power reduction $P_{set,i}$ for each participating wind power plant of the plurality of wind power plants, wherein determining the individual setpoint power reduction comprises:
         determining an available power $P_{avail(i)}$ for each of the participating wind power plants,
         determining a power reduction proportion $\Delta P_i$ for each participating wind power plant using an optimization method that is based on an optimization condition of equal power increase time $T_{regain, opt} = T_{regain, i}$ for all of the participating wind power plants, wherein the determination of the power reduction proportion is repeated until the optimization method meets a presettable termination criterion, and
         subtracting the power reduction proportion $\Delta P_i$ for a respective participating wind power plant from the available power $P_{avail(i)}$ for the respective participating wind power plant; and
      provide the individual setpoint power reduction $P_{set,i}$ to each participating wind power plant for throttling each participating wind power plant.

* * * * *